United States Patent
Yeung

(10) Patent No.: US 11,237,011 B2
(45) Date of Patent: Feb. 1, 2022

(54) ROADWAY INFORMATION DETECTION SENSOR DEVICE/SYSTEM FOR AUTONOMOUS VEHICLES

(71) Applicant: Peter Yeung, Ottawa (CA)

(72) Inventor: Peter Yeung, Ottawa (CA)

( * ) Notice: Subject to any disclaimer, the term of this patent is extended or adjusted under 35 U.S.C. 154(b) by 216 days.

(21) Appl. No.: 15/784,168

(22) Filed: Oct. 15, 2017

(65) Prior Publication Data

US 2019/0113355 A1 Apr. 18, 2019
US 2021/0080276 A9 Mar. 18, 2021

(30) Foreign Application Priority Data

Oct. 18, 2016 (CA) .................. CA 2945564

(51) Int. Cl.
*G05D 1/02* (2020.01)
*G01C 21/34* (2006.01)

(52) U.S. Cl.
CPC ....... *G01C 21/3492* (2013.01); *G05D 1/0217* (2013.01); *G05D 1/0244* (2013.01); *G05D 1/0236* (2013.01); *G05D 1/0242* (2013.01); *G05D 1/0255* (2013.01); *G05D 1/0257* (2013.01); *G05D 2201/0213* (2013.01)

(58) Field of Classification Search
CPC .. G05D 1/0234; G05D 1/0236; G05D 1/0217; G05D 1/0242; G05D 1/0244; G05D 1/0255; G05D 1/0257; G05D 2201/0213; G01C 21/3492
USPC .......................................................... 701/26
See application file for complete search history.

(56) References Cited

U.S. PATENT DOCUMENTS

| | | | | |
|---|---|---|---|---|
| 4,847,773 A * | 7/1989 | van Helsdingen | ... | G05D 1/0234 701/25 |
| 4,974,259 A * | 11/1990 | Takahashi | ............... | B61L 27/04 246/122 R |
| 5,390,118 A * | 2/1995 | Margolis | ............... | G01S 17/931 701/23 |
| 5,790,403 A * | 8/1998 | Nakayama | ........... | G05D 1/0246 340/435 |
| 5,913,376 A * | 6/1999 | Takei | ................. | B60K 31/0058 180/168 |
| 5,957,983 A * | 9/1999 | Tominaga | ................ | B62D 1/28 701/23 |
| 6,215,392 B1 * | 4/2001 | Okada | ...................... | B62D 1/28 340/436 |
| 6,226,592 B1 * | 5/2001 | Luckscheiter | ....... | B62D 15/025 180/411 |
| 6,336,064 B1 * | 1/2002 | Honkura | ................ | G01C 21/26 180/167 |
| 6,414,606 B1 * | 7/2002 | Yujiri | ..................... | H01Q 15/08 340/901 |
| 6,934,613 B2 * | 8/2005 | Yun | ....................... | B60W 10/06 701/23 |
| 7,140,803 B2 * | 11/2006 | Cummings | ............... | E01F 9/30 404/12 |

(Continued)

*Primary Examiner* — Joshua E Rodden

(57) ABSTRACT

A system for an autonomous vehicle by providing lane markers on the road for which a vehicle will read and navigate the road. The vehicle transmits a discovery signal and is returned from the marker to indicate the position on the road and how to proceed on the road. The system uses either an autonomous control system or 3D map navigation database to determine the direction of the vehicle in real time.

15 Claims, 4 Drawing Sheets

(56) References Cited

U.S. PATENT DOCUMENTS

| | | | | |
|---|---|---|---|---|
| 8,433,467 | B2* | 4/2013 | Ross-Martin | G05D 1/0234 701/23 |
| 9,080,866 | B1* | 7/2015 | Dowdall | G01S 17/023 |
| 9,261,881 | B1* | 2/2016 | Ferguson | G05D 1/0236 |
| 9,383,753 | B1* | 7/2016 | Templeton | G05D 1/0246 |
| 10,127,462 | B1* | 11/2018 | Pratt | G06K 9/00798 |
| 2008/0040029 | A1* | 2/2008 | Breed | B60N 2/2863 701/514 |
| 2008/0228400 | A1* | 9/2008 | Wheeler | E01F 9/578 701/301 |
| 2012/0070227 | A1* | 3/2012 | Asgari | E01F 9/506 404/12 |
| 2012/0098657 | A1* | 4/2012 | Bogatine | G08G 1/167 340/439 |
| 2015/0142251 | A1* | 5/2015 | Aldereguia | G06K 9/00818 701/28 |
| 2016/0132705 | A1* | 5/2016 | Kovarik | G06K 7/10376 340/10.3 |
| 2018/0022347 | A1* | 1/2018 | Myers | G01S 17/86 701/26 |
| 2018/0335781 | A1* | 11/2018 | Chase | G08G 1/096758 |
| 2019/0072976 | A1* | 3/2019 | Bell | C09D 5/22 |
| 2019/0079530 | A1* | 3/2019 | Steder | G05D 1/0234 |
| 2019/0367012 | A1* | 12/2019 | Matta | G06K 9/00791 |
| 2020/0233425 | A1* | 7/2020 | Takahashi | G05D 1/0217 |
| 2021/0166052 | A1* | 6/2021 | Park | G06N 3/08 |

\* cited by examiner

ROADWAY INFORMATION DETECTION SENSOR DEVICE/SYSTEM FOR AUTONOMOUS VEHICLES

FIELD OF THE INVENTION

The present invention relates to the guidance of autonomous vehicles and in particular, relates to guiding an autonomous vehicle along a roadway by means of passive lane markers during normal and inclement weather that will work under any luminous conditions.

BACKGROUND OF THE INVENTION

Currently autonomous vehicles are helpless without a system of navigation. In use today, the navigation system is either GPS based for obtaining details of the roads or LiDAR (Light Detection and Ranging) for mapping of the road networks. This pre-mapping of the road is inefficient and, in most cases, impractical if there are continual changes to the roadways on an hourly and daily basis. These constant changes can create havoc to autonomous vehicles on the road if they do not have the latest updates or changes of the road networks. This could potentially result in a big catastrophe. Even if feasible, the amount of changes will require a multitude of road networks to be re-mapped. This will not give the autonomous vehicles the information it needs to navigate the roadway in a timely manner.

Furthermore, current technologies such as optical systems (e.g. camera), LiDAR, and other roadway interpretation systems fail under severe weather conditions and under certain luminous conditions. As such, the present invention will help evolve the self-driving, autonomous vehicles to navigate the road in a more effective manner under normal or severe weather condition and any luminous conditions.

Based on the preliminary research of the current technologies that is deployed or proposed to solve the navigation for the autonomous vehicles on our roads today, all fail to navigate under inclement weather conditions and are costly to implement.

As an example, in U.S. Pat. No. 9,080,866 B1 it claims that ifs using a laser detection system to pick up reflections from the lane marker reflective property. Under inclement weather this system will fail as snow, ice, fog, or rain will cause havoc with a laser based detection system. The laser will not be able to penetrate heavy snow and may get a false reflection signal from bouncing off the snow.

In another example from patent US 2015/0303581A1, a reflector which contains both microwave retro-reflector and an embedded tuned circuit is claimed. This type of system tends to be expensive to implement as it requires installing active circuitry devices along the many miles of the road as lane markers. And not to mention these active devices could become malfunction or die altogether over time.

Accordingly, it would be beneficial to provide autonomous vehicles with sensors which are able to pick-up or sense the location of marker(s) on the road particularly under inclement weather conditions. It would be further beneficial if the deployed markers provided an economical and efficient way to implement a self-assisted navigation system. It would be further beneficial for such markers to be deployed using a modification to the existing lane marking painting techniques used to mark roads both permanently and during construction.

SUMMARY OF THE INVENTION

This disclosure relates to an autonomous vehicle and a system from controlling the same. More specifically, the present disclosure is directed towards autonomous vehicles with a plurality of sensor devices to read road information to navigate along the roadway.

It is the objective of the present disclosure to provide an improved autonomous vehicle and a system of sensor devices for detecting the road information from passive lane markers which can be read when in severe weather conditions and/or luminous conditions.

According to an embodiment of the invention there is provided a method comprising providing a forward directed RF beam which is reflected from special lane markers along the roadway and detected by the vehicle sensors. The lane markers are of a passive metallic material such as ferrous metals which may be either embedded in the roadway or painted on the roadway surface. The metals may be dispersed in the pavement lane of a roadway or be embedded along the strips of the laneway.

According with an aspect of the invention passive metallic material is applied in strips painted along a laneway or are embedded along the entire lane. The use of passive metallic materials rather than magnetic materials is more economic and allows the vehicle sensors to detect lane markers from a further distance. The short magnetic field depth of magnets within road markers has a limiting effect on the readability by vehicle sensors particularly in the forward and backward directions.

In another aspect of the invention a vehicle transmitting and receiving system of an autonomous vehicle for directing the vehicle along lane markers comprising:
  receiving reflected RF signals from lane markers on a roadway including from markers in the forward direction of the vehicle wherein the lane markers are of passive metallic materials;
  said reflect signals originating from transmitted radio frequency beams of the vehicle system for reflection from the lane markers;
  processing said reflected signals to outline a direction for the vehicle for travel; and
  providing said processed signal to the vehicle autonomous control system.

In a further aspect of the invention an autonomous vehicle system for use on roadways having road markers where said vehicle system having means for transmitting radio frequency signals and sensors receiving reflected signals from said road markers and recording the same on the vehicle system comprising:
  a vehicle transmitting and receiving system of an autonomous vehicle for directing the vehicle along lane markers comprising:
  receiving reflected signal from lane markers in the forward direction of the vehicle wherein the lane markers are passive metallic material;
  said reflect signals originating from transmitted radio frequency beams of the vehicle system for reflection from the lane markers;
  processing said reflected signals to outline a direction for the vehicle for travel; and
  providing said processed signal to the vehicle autonomous control system.

An autonomous vehicle system for use on roadways having road markers, said vehicle system comprising having means for transmitting radio frequency signals and sensors receiving reflected signals from said road markers and recording the same on the vehicle system comprising:
  road markers of passive metallic material;
  a transmission system located on said vehicle for directing RF beans in all directions toward the road markers;

said metallic lane markers reflecting part of the beams toward the vehicle system;

sensors on said vehicle for detecting the reflected signals from said lane marks and connected to signal acquisition, identification and processing system;

an autonomous control system or map for receiving the processed signals whereby road markers are formulated for a navigation path in advance of the vehicle and a roadway path is mapped in real-time and updated to a network.

Additional objects, features and advantages of the present invention will become more readily apparent from the following embodiments when taken in conjunction with the drawings wherein the reference numerals refer to the corresponding parts in the several views.

Additional advantages may be realized with the present invention.

DETAILED DESCRIPTION OF THE DRAWINGS

The description herein makes reference to the accompanying drawings below wherein like reference numerals refer to like parts throughout the several views, and wherein:

FIG. 1 illustrates the top-down view of an autonomous vehicle showing a block diagram of the transmitter and receiver 2 strategically mounted on the vehicle 1 (in this case at the front) pointing down towards the road. Also shown is the RF transmitted wave impinging on the lane markers 5 installed along the roadway 3 and being reflected back 4 towards the sensor antenna of the transmitter and receiver 2. This reflected signal is used by the central processing hub and autonomous control system for further processing and mapping of the roadway for navigation as illustrated in FIG. 3.

FIG. 2 illustrates how the sensors not only require detecting the lane markers immediately adjacent to the vehicle, but they also need to detect the lane markers that are either one or multiple lane(s) over from the current lane that the vehicle is on.

Figure 4:
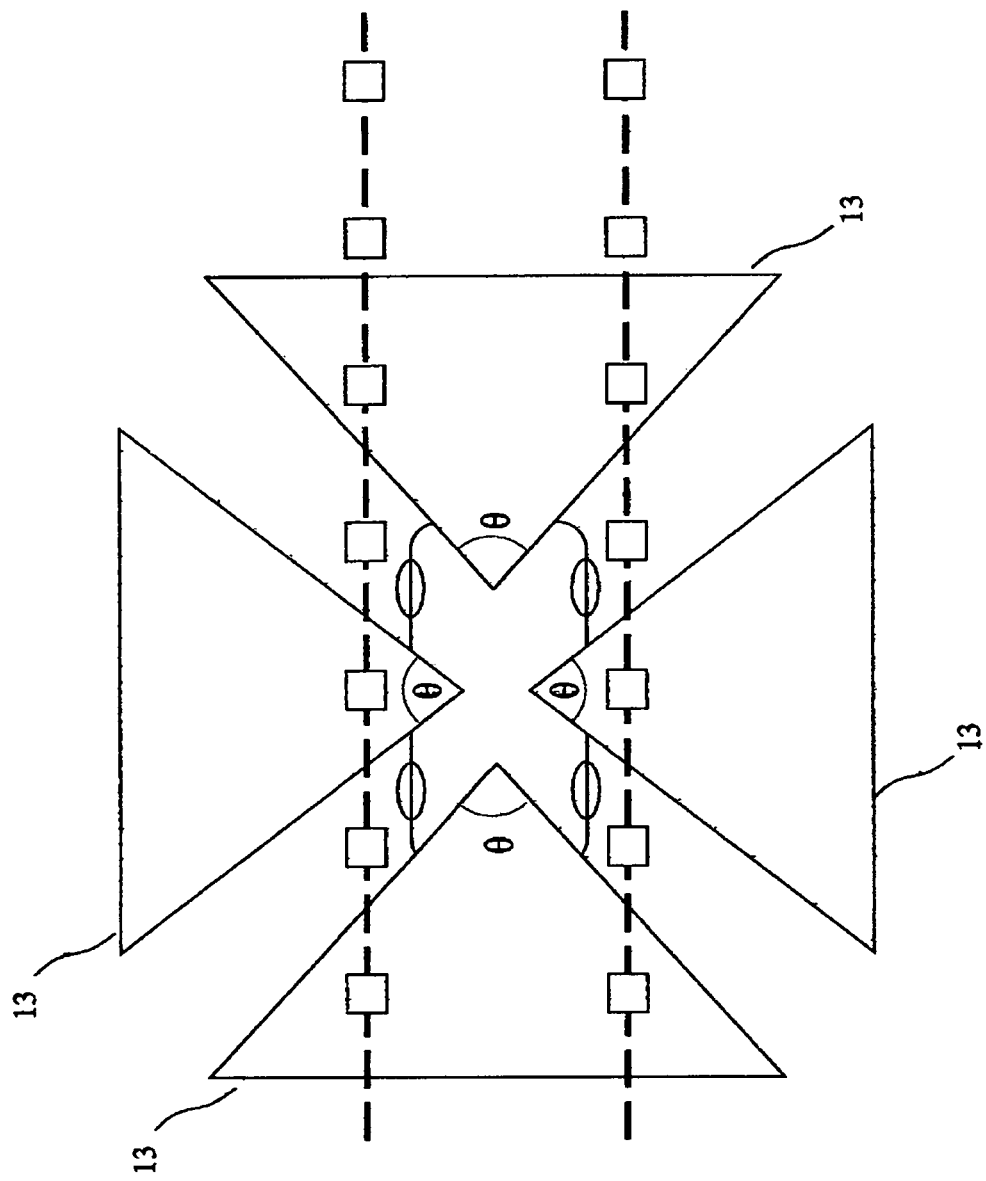

FIG. 4 is a top-down view showing 4 antennas strategically placed on the vehicle to cover all 4 sides of the vehicle while pointing down towards the road, the diagram illustrates along a straight road. Each antenna will have a certain beamwidth θ (in degrees) to encompass the side of the vehicle it is intended for and to ensure sufficient coverage overlap to pick up most of the lane markers for proper and accurate mapping of the roadway.

DETAILED DESCRIPTION

Figure 1:
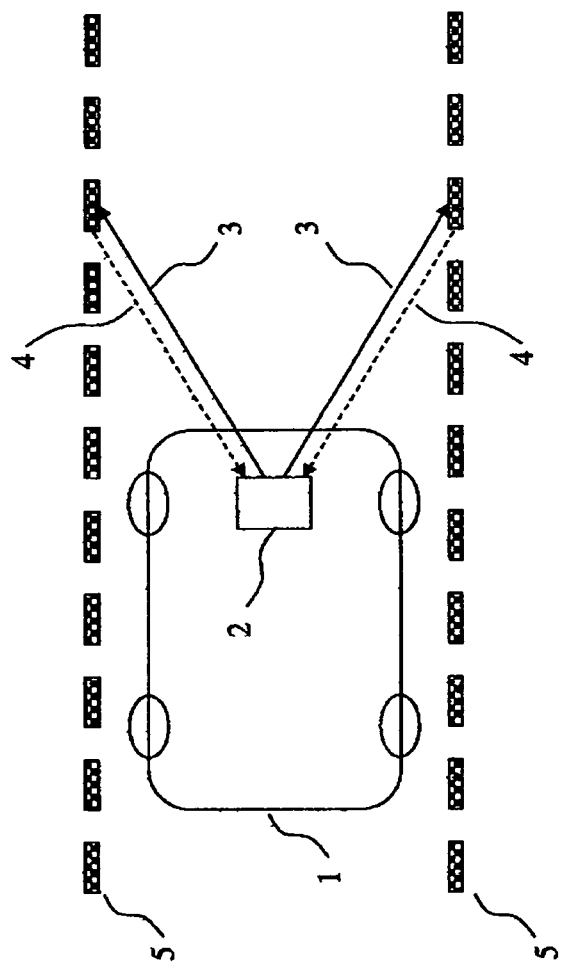

FIG. 1 illustrates RF transmitted energy 3 from the vehicle 1 rooftop is incident upon the lane markers 5 and bouncing back towards the sensor 2. The sensor 2 can either be a complete unit system with an integrated sectorized antenna (a ruggedized design suitable for withstanding severe weather condition while strategically placed on the inside or outside of the vehicle), or it can simply be the sensor installed inside the vehicle 1 while a ruggedized, sectorized antenna (connected to the sensor via a RF cable) is strategically mounted on the vehicle exterior.

Based on the time of arrival and incident angle of the reflected signal 4, the distance between the vehicle and the lane marker(s) can be calculated. In order to have sufficient data points to formulate a mapping of the roadway, the transmitted signal 3 is required to be sent out frequently at multiple samples per second.

In order to cover the front, back, and sides of the vehicle, multiple sensors and their associated antennas will be required to be installed. The number of sensors required is dictated by the achievable data point resolution to accurately generate a map of the road. As such, the sensor antenna coverage beamwidth and gain to resolve and coherently receive the reflected signal performance will contribute to the number of sensors required.

Figure 2:
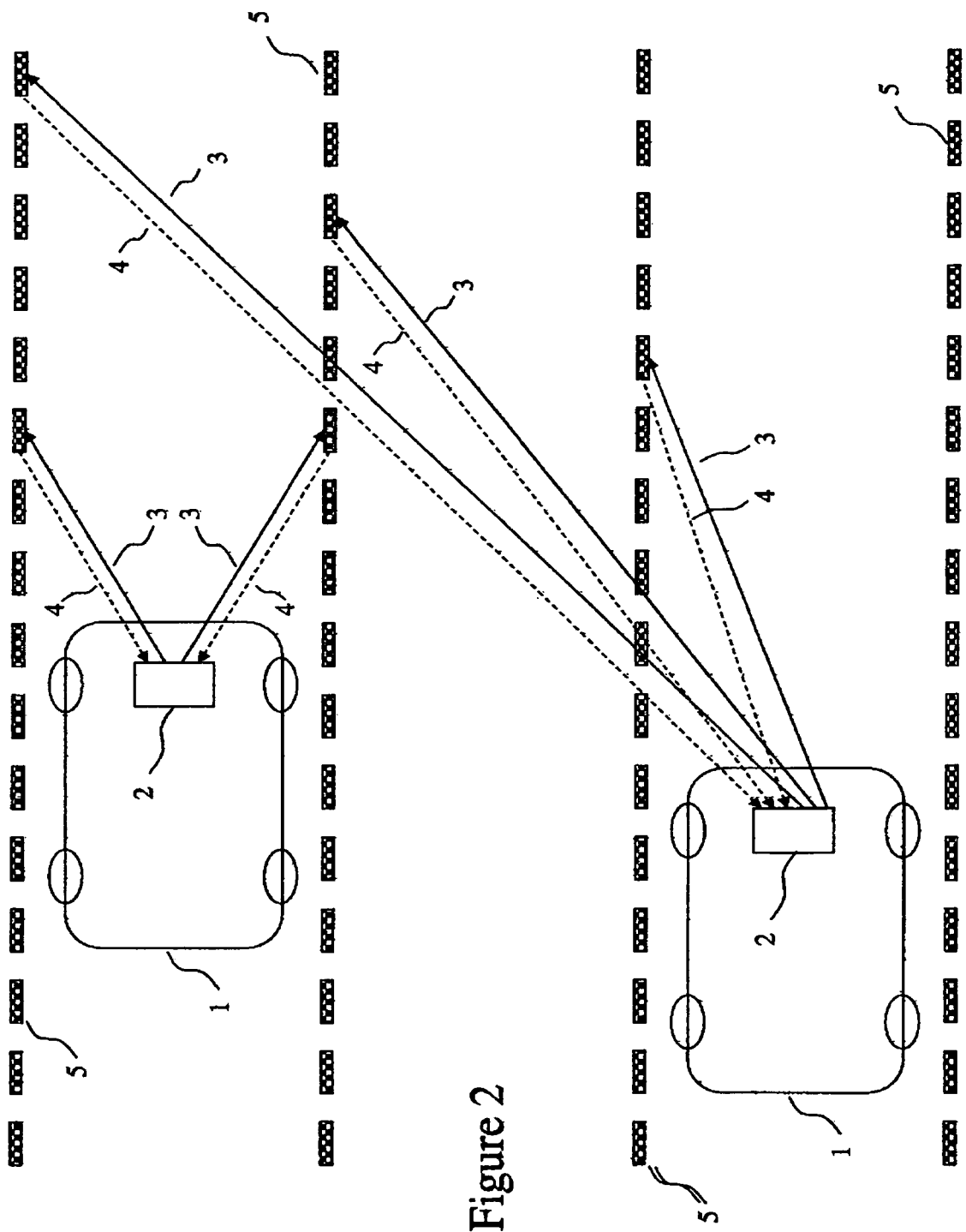

FIG. 2 illustrates how the sensors not only require to detect the lane markers immediately adjacent to the vehicle, but they also need to detect the lane markers that are one or multiple lane(s) over from the current lane that the vehicle is on. Although FIG. 2 only shows the one lane over to the left of the current lane that the vehicle is on, the same scenario or concept applies to the lane over to the right of the current lane. And similar to FIG. 1, the front, back, and sides of the vehicle must be accounted for by the sensors. This is necessary for making proper lane changes.

Figure 3:
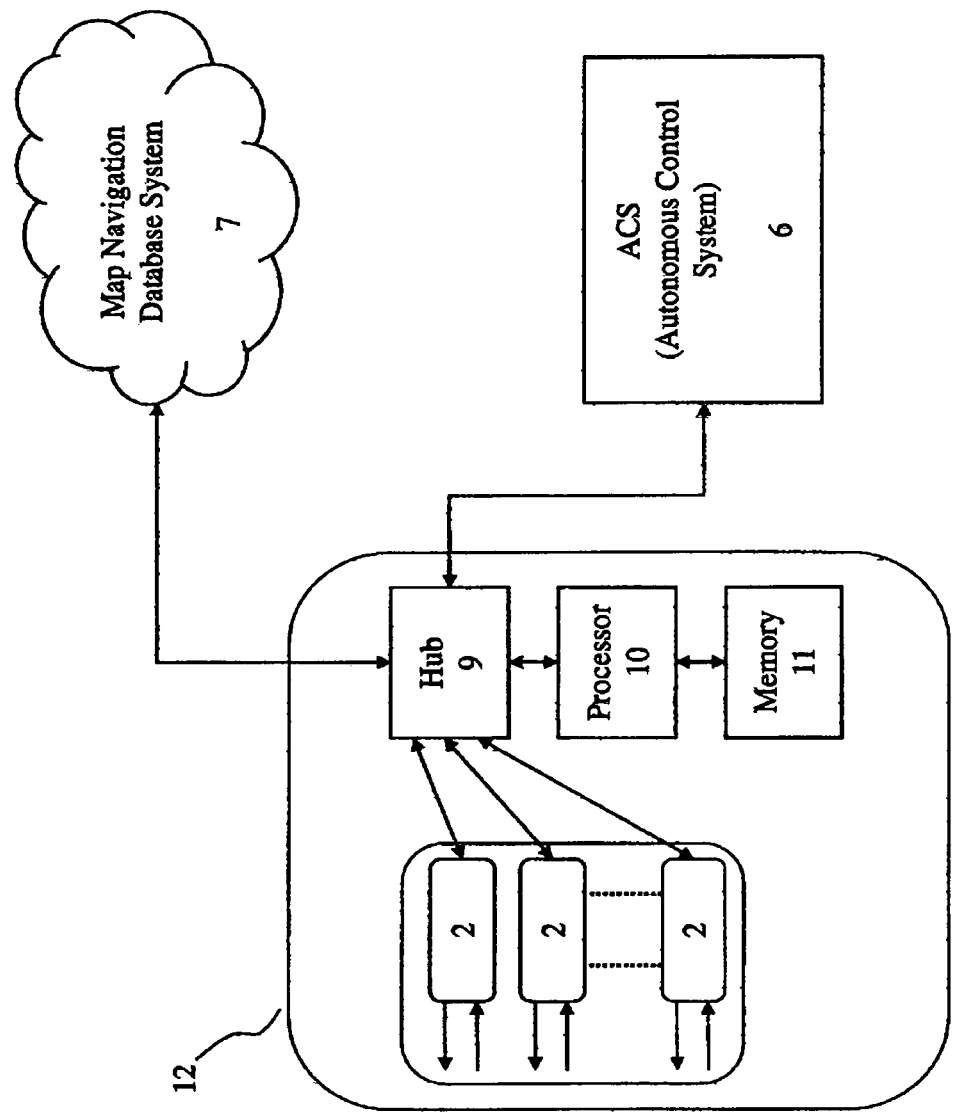
FIG. 3 is a block diagram illustrating the systems embodiment of the invention.

FIG. 3 shows the acquisition identification and processing system 12, sensors 8, hub 9, processor 10 and memory 11 showing where the roadway information is acquired, identified and processed. Once the information is processed and the information parsed and identified then it is sent to the Autonomous Control System (ACS) 6 and/or the map navigation database system 7. Below briefly explains the function of each entity and how each interacts with one another.

The sensor sends nut the discovery signal from the autonomous vehicle to discover the lane marker(s) as explained in FIG. 1 above.

All the received data from the sensors are processed by the hub. The main goal of the system is to identify the lane markers. After the lane markers are identified and processed, this information is passed to the Autonomous Control System 6 and/or the map navigation system 7. This has to happen in real time and in, advance of the path the vehicle is traveling on.

The map navigation database system 7, where the road networks are detailed and created into three dimensional so that the autonomous vehicle can use to traverse to its destination. In the scenario where the autonomous vehicle relies on using the detailed mapping database system to obtain the lane information as it is traveling, then the acquisition, identification and processing system 12 will compare the lane marking information on the map to see if it is up to date with the newly acquired information. In the event the lane markers are out of date, the system thus flags the changes for the mapping system to make the updated changes.

In a scenario where the autonomous vehicle is acquiring the road information in real time, the identified lane marker information is passed directly to the Autonomous Control System (ACS) for use in navigating the roadway. Once the autonomous vehicle has successfully navigated the roadway, then this information is passed to the mapping system to compare and update lanes marking information for future use via locally stored or, via other mapping system on the network.

FIG. 4 shows the coverage angle of each transmitted beam from the autonomous vehicle to the lane markers for all sides 13. The reflected signal from the passive lane markers is processed, and from this the relative distance of each lane marker to the vehicle is determined. The sensors send out discovery signals to find out the lane markers from all sides of the vehicle to indicate that the vehicle is within the corresponding lane markers. As the lane markers are detected then adjustments are made through the autonomous control system and may involve reducing the speed of the vehicle.

In the event the vehicle is required to go in the reverse direction it would have all the needed information to complete its task.

As all the lane markers are learnt from all sides of the vehicle, this information can be stored in a map navigation database, or the autonomous control system depending on which database is being used. Further, with the mapping the vehicle can update the mapping process for other vehicles in real time if there have been changes to the road due to construction or other such adjustments. This real time updated information can be sent to the network including cloud computer and/or fog computing.

Based on the above, in the referred embodiment depicted, the system will work even under severe adverse weather conditions. The active sensor devices in the autonomous vehicle continue to read the lane and roadway information at certain frequency interval in real-thine. The sensor devices in the autonomous vehicle can function independently as a stand-alone system or in conjunction with other existing navigation system (such as the GPS or Lidar system for example) to give it finer details of the roadway that it is travelling on. The proposed system is superior to other existing systems because, unlike other existing systems, this system will continue to work autonomously even under severe weather conditions such as heavy snowstorm, ice, fog or any other inclement weather.

It is important for the autonomous vehicle to have the latest road network details to navigate. These sensor devices can be strategically placed in, or mounted on, the vehicle to enable them to read the most accurate road information for either a straight or bent road.

Note that the proposed system does not require modification to the existing road networks, with the exception of changing the paint based material used for painting the lane lines/markets. As well, the lane markers could also be made of metallic lane markers. Thus, to summarize, the following is a sequence of steps that must happen for the autonomous vehicle to navigate the roadway in the most effective manner 1. The sensor devices would send a discovery signal ahead using sonar or radio frequency (RF) technology for example.
2. The metallic paints or metallic lane markers bounces the discovered information back to the source.
3. The sensor device in the vehicle receives the discovered information signal (bounced off the lane markers) and passes it on to the processing hub.
4. The hub interprets/processes the information as it receives it in real time.
5. The processed information is translated to a format that is consumable by the autonomous control system or map navigation database system.
6. The autonomous control system or map navigation database system processes the information and makes decision based on the received discovered signals from the proposed sensor devices.

In order to have the most effective and accurate road information, the sensors would read the information from ahead and from both sides of the vehicle to determine the lane structures. Each side of the road may provide different information as the vehicle travels ahead. Once the information is obtained by the autonomous control system and/or map navigation database system, it then processes it and formulates a decision on how to best navigate. The RF beam in conjunction with other well-known signal sending and receiving devices allows the proposed system to work in most weather conditions and/or luminous conditions.

Although described with reference to referred embodiments of the invention, it should be readily understood that various changes and/or modifications can be made to the invention without departing from the spirit thereof. In general, the invention is only intended to be limited by the scope of the following claims.

The invention claimed is:

1. A method comprising:
providing a radio frequency (RF) module forming part of an autonomous vehicle comprising one or more RF transmitters and one or more RF receivers; wherein
the one or more RF transmitters transmit radio frequency (RI) signals from the autonomous vehicle; and
the one or more RF receivers received reflected RF signals, the reflected RF signals being reflected from a plurality of passive road markers disposed upon a surface being traversed by the autonomous vehicle, each passive road marker of the plurality of passive road markers being in a predetermined spatial relationship to the remainder of the plurality of passive road markers; and
providing a hub forming part of the autonomous vehicle which executes a process comprising:
processing the reflected RF signals received from the plurality of passive road markers to establish lane marker information, the established lane marker information comprising relative distances of each passive road marker of the plurality of road markers from the autonomous vehicle; and
determining in dependence upon the processed reflected RF signals received from the plurality of road markers a position of the autonomous vehicle relative to the plurality of road markers; wherein
the plurality of passive lane markers comprises passive lane markers defining a current lane the autonomous vehicle is currently travelling within and other passive lane markers defining one or more lanes over from the current lane.

2. The method according to claim 1, wherein each road marker of the plurality of passive road markers comprises one or more metallic elements.

3. The method according to claim 1, wherein each road marker of the plurality of passive road markers comprises metallic paint.

4. The method according to claim 1, wherein
each passive road marker of the plurality of passive road markers comprises a paint based material comprising metallic elements;
the metallic elements reflect the RF signals from the one or more RF transmitters; and
the paint based material allows a user of a non-autonomous vehicle to navigate the non-autonomous vehicle upon the surface.

5. The method according to claim 1, further comprising
passing the established lane marker information to a control system of the autonomous vehicle; and
adjusting, with the control system, the autonomous vehicle in dependence upon the established lane marker information.

6. The method according to claim 1, further comprising
passing the established lane marker information to a control system of the autonomous vehicle; and adjusting, with the control system, the autonomous vehicle in dependence upon the established lane marker information wherein the adjustment is a reduction in speed of the autonomous vehicle.

7. The method according to claim 1, further comprising
passing the established lane marker information to a control system of the autonomous vehicle;
adjusting, with the control system, the autonomous vehicle in dependence upon the established lane marker information; and
storing the established lane marker information within a three-dimensional (3D) navigation database associated with the autonomous vehicle.

8. The method according to claim 1, further comprising
passing the established lane marker information to a control system of the autonomous vehicle;
adjusting, with the control system, the autonomous vehicle in dependence upon the established lane marker information;
passing the established lane marker information to a mapping system to determine whether the established lane marker information corresponds to lane marking information on a three-dimensional (3D) map associated with the surface on which the autonomous vehicle is travelling; and
upon establishing a difference between the established lane marker information and the lane marking information on the three-dimensional (3D) map flagging the change for the mapping system to update the map; wherein
the mapping system is associated with the autonomous vehicle.

9. The method according to claim 1, further comprising
passing the established lane marker information to a control system of the autonomous vehicle;
adjusting, with the control system, the autonomous vehicle in dependence upon the established lane marker information;
passing the established lane marker information to a mapping system to determine whether the established lane marker information corresponds to lane marking information on a three-dimensional (3D) map associated with the surface on which the autonomous vehicle is travelling; and
upon establishing a difference between the established lane marker information and the lane marking information on the three-dimensional (3D) map flagging the change for the mapping system to update the map; wherein
the mapping system is remote from the autonomous vehicle.

10. The method according to claim 1, further comprising
passing the established lane marker information to a control system of the autonomous vehicle;
adjusting, with the control system, the autonomous vehicle in dependence upon the established lane marker information;
passing the established lane marker information to a mapping process in execution upon a mapping system to determine whether the established lane marker information corresponds to lane marking information on a three-dimensional (3D) map associated with the surface on which the autonomous vehicle is travelling; and
upon establishing a difference between the established lane marker information and the lane marking information on the three-dimensional (3D) map updating mapping processes of other autonomous vehicles.

11. The method according to claim 1, wherein
processing the reflected RF signals received from the plurality of passive road markers to establish lane marker information comprising processing a time of arrival and incident angle of the reflected RF signal.

12. The method according to claim 1, further comprising
passing the established lane marker information to a control system of the autonomous vehicle;
adjusting, with the control system, the autonomous vehicle in dependence upon the established lane marker information; wherein
the RF module and hub provide for control of the autonomous vehicle under a severe weather condition; and
the severe weather condition is selected from the group comprising snow, a snowstorm, ice and fog.

13. The method according to claim 1, further comprising
passing the established lane marker information to a control system of the autonomous vehicle;
performing, with the control system, a lane change from the current lane to an adjacent lane; wherein
the adjacent lane is the a lane of the one or more lanes over from the current lane.

14. The method according to claim 1, further comprising
passing the established lane marker information to a control system of the autonomous vehicle;
adjusting, with the control system, the autonomous vehicle in dependence upon the established lane marker information; and
storing the established lane marker information within a three-dimensional (3D) navigation database associated with the autonomous vehicle.

15. The method according to claim 1, further comprising
passing the established lane marker information to a control system of the autonomous vehicle;
adjusting, with the control system, the autonomous vehicle in dependence upon the established lane marker information; and
storing the established lane marker information within a remote three-dimensional (3D) navigation database accessible to a plurality of autonomous vehicles of which the autonomous vehicle is one.

* * * * *